US011807277B2

(12) United States Patent
Hara et al.

(10) Patent No.: US 11,807,277 B2
(45) Date of Patent: Nov. 7, 2023

(54) DRIVING ASSISTANCE APPARATUS (71) Applicant: TOYOTA JIDOSHA KABUSHIKI KAISHA, Toyota (JP)

(72) Inventors: Kenichiroh Hara, Yokohama (JP); Naruhisa Yoshida, Tokyo-to (JP); Kazuhiro Tomosue, Tokyo-to (JP); Shunichiroh Sawai, Tokyo-to (JP); Naoki Nishimura, Tokyo-to (JP); Takanori Kusakabe, Gotemba (JP); Tomoyuki Yoshida, Nisshin (JP); Shogo Konishi, Susono (JP); Hirofumi Mori, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 49 days.

(21) Appl. No.: 16/931,525

(22) Filed: Jul. 17, 2020

(65) Prior Publication Data
US 2021/0016804 A1 Jan. 21, 2021

(30) Foreign Application Priority Data
Jul. 18, 2019 (JP) .................................. 2019-133020

(51) Int. Cl.
*B60W 60/00* (2020.01)
*B60W 40/08* (2012.01)
*B60W 50/14* (2020.01)

(52) U.S. Cl.
CPC ........ *B60W 60/0059* (2020.02); *B60W 40/08* (2013.01); *B60W 50/14* (2013.01);
(Continued)

(58) Field of Classification Search
CPC .. B60W 60/0059; B60W 40/08; B60W 50/14; B60W 60/0051; B60W 60/0053;
(Continued)

(56) References Cited

U.S. PATENT DOCUMENTS

| 2010/0265074 A1* | 10/2010 | Namba | ................ | G06V 20/597 |
| | | | | 340/576 |
| 2018/0141570 A1* | 5/2018 | Kimura | ................ | B60W 40/08 |

(Continued)

FOREIGN PATENT DOCUMENTS

| CN | 108068698 A | 5/2018 |
| JP | 2015032054 A | 2/2015 |

(Continued)

OTHER PUBLICATIONS

Thierry Mousel, et al., "Hands Off Detection Requirements for UN R79 Regulated Lane Keeping Assist Systems," 25th International Technical Conference on the Enhanced Safety of Vehicles (ESV).

*Primary Examiner* — James J Lee
*Assistant Examiner* — Tawri M McAndrews
(74) *Attorney, Agent, or Firm* — Dickinson Wright, PLLC (57) ABSTRACT

Provided is a driving assistance apparatus (a control unit (100)) for a vehicle capable of hands-off driving that lets a driver take his or her hands off the steering wheel. The driving assistance apparatus includes a processor (10) configured to determine, on the basis of sensor information indicating a state of the driver, whether or not the driver is in a state unsuitable for the surrounding monitoring of the vehicle during the hands-off driving, warn the driver through a notification device when it is determined that the driver is in a state unsuitable for the surrounding monitoring, and notify the driver, through the notification device, of a request for holding the steering wheel.

2 Claims, 8 Drawing Sheets (52) U.S. Cl.
CPC .... *B60W 60/0051* (2020.02); *B60W 60/0053* (2020.02); *B60W 2050/143* (2013.01); *B60W 2050/146* (2013.01)

(58) Field of Classification Search
CPC ..... B60W 2050/143; B60W 2050/146; B60W 60/0057; B60W 2540/223; B60W 2540/229; B60W 2040/0818; B60W 2040/0827
See application file for complete search history.

(56) References Cited

U.S. PATENT DOCUMENTS

| | | | |
|---|---|---|---|
| 2018/0154936 A1* | 6/2018 | Yamasaki | B62D 15/025 |
| 2019/0039618 A1 | 2/2019 | Mori | |
| 2019/0065873 A1* | 2/2019 | Wang | G06V 20/46 |
| 2019/0072957 A1 | 3/2019 | Fujimura et al. | |
| 2019/0155279 A1 | 5/2019 | Tayama | |
| 2019/0185039 A1* | 6/2019 | Park | B62D 15/029 |
| 2019/0304309 A1 | 10/2019 | Sakamoto et al. | |
| 2020/0231182 A1* | 7/2020 | Oba | B60W 50/14 |
| 2020/0239027 A1* | 7/2020 | Watanabe | G05D 1/0088 |
| 2020/0307641 A1* | 10/2020 | Oyama | B60W 40/08 |
| 2020/0307644 A1* | 10/2020 | Hattori | B60W 60/0053 |
| 2021/0004619 A1* | 1/2021 | Qin | G06V 10/454 |
| 2021/0078492 A1* | 3/2021 | Narumi | B60W 50/14 |

FOREIGN PATENT DOCUMENTS

| | | | |
|---|---|---|---|
| JP | 2017030390 A | | 2/2017 |
| JP | 2017159885 A | | 9/2017 |
| JP | 2017207955 A | | 11/2017 |
| JP | 2018-081624 A | | 5/2018 |
| JP | 2020-166391 A | | 10/2020 |
| WO | 2018105114 A1 | | 6/2018 |
| WO | 2018116618 A1 | | 6/2018 |

* cited by examiner

DRIVING ASSISTANCE APPARATUS

FIELD OF THE INVENTION

The present invention relates to a driving assistance apparatus that assists a driver in driving a vehicle.

BACKGROUND OF THE INVENTION

Regarding automatic driving systems capable of switching between automatic driving and manual driving, Japanese Unexamined Patent Publication (Kokai) No. 2017-159885 proposes a technique that detects, as a driver detection signal, driver's distraction, reduced level of wakefulness, increased level of inattentiveness, and the like, and determines, on the basis of the driver detection signal, the levels of driver's wakefulness and inattentiveness, driver's driving posture information, and the like.

SUMMARY OF THE INVENTION

Japanese Unexamined Patent Publication (Kokai) No. 2017-159885 describes an offering of information on transfer of driving operations from an automatic driving function to the driver in accordance with the levels of driver's wakefulness and inattentiveness, and the like.

However, as the vehicle driver's attention is distracted from driving during automatic driving, a problem arises in that simply warning the driver in accordance with the levels of the driver's wakefulness and inattentiveness, the driver's driving posture, and the like is not enough to make the driver pay attention to driving.

Accordingly, it is an object of the present invention to provide a driving assistance apparatus capable of making a driver pay attention to driving.

The present invention was made so as to solve the above problem and has as its gist the following.

(1) A driving assistance apparatus for a vehicle capable of hands-off driving that lets a driver take his or her hands off a steering wheel, the driving assistance apparatus comprising:
a processor configured to:
determine, on a basis of sensor information indicating a state of the driver, whether or not the driver is in a state unsuitable for surrounding monitoring of the vehicle during the hands-off driving;
warn the driver through a notification device when it is determined that the driver is in the state unsuitable for the surrounding monitoring; and
notify the driver, through the notification device, of a request for holding the steering wheel.

(2) The driving assistance apparatus according to above (1), wherein the processor notifies the driver of the request after cancellation of the warning.

(3) The driving assistance apparatus according to above (1), wherein the processor notifies the driver of the request simultaneously with cancellation of the warning.

(4) The driving assistance apparatus according to above (1), wherein the processor cancels the notification when the driver maintains a state of holding the steering wheel continuously for a certain period of time after starting the notification.

(5) The driving assistance apparatus according to above (1), wherein the processor determines whether or not the driver is in the state unsuitable for the surrounding monitoring even after starting the notification, and wherein the processor cancels the notification when, after starting the notification, the driver maintains the state suitable for the surrounding monitoring continuously for a certain period of time and maintains the state of holding the steering wheel continuously for the certain period of time.

(6) The driving assistance apparatus according to above (1), wherein the processor cancels the notification when a certain period of time passes after starting the notification.

(7) The driving assistance apparatus according to above (1), wherein the processor makes the notification before the warning when switching from automatic driving control to manual driving control after passage of a certain period of time is notified and it is determined that the driver is in the state unsuitable for the surrounding monitoring, and wherein the processor makes the warning after the notification is cancelled.

The driving assistance apparatus according to the present invention has an advantageous effect that can make a driver pay attention to driving.

DESCRIPTION OF EMBODIMENTS

Hereinafter, a driving assistance system 40 will be described with reference to the drawings. The driving assistance system 40 is mounted in a vehicle, for example, capable of driving that lets a driver take his or her hands off the steering wheel (hands-off driving). As an example of such driving, assume driving at about level 2 or level 3 is specified by the Society of Automotive Engineers (SAE).

While traveling in a vehicle, the driver may be in a state unsuitable for driving the vehicle. Examples of such an unsuitable state include driver's states of dozing off and being distracted without paying attention to the road ahead.

When the driver is in a state unsuitable for driving the vehicle, simply warning the driver may not be enough to turn the driver's attention to driving. Particularly, when the vehicle itself autonomously controls driving to some extent, the driver's attention is distracted from driving, due to which even when the driver is warned, he or she may not pay enough attention to driving. As a result, the driver does not perform driving operations when he himself or she herself is required to perform them, which may not be enough to sufficiently prevent an accident.

The driving assistance system 40 of the present embodiment increases a level of driver's involvement in driving against unsafe behaviors of the driver, such as dozing off and being distracted, during hands-off driving.

Figure 1:
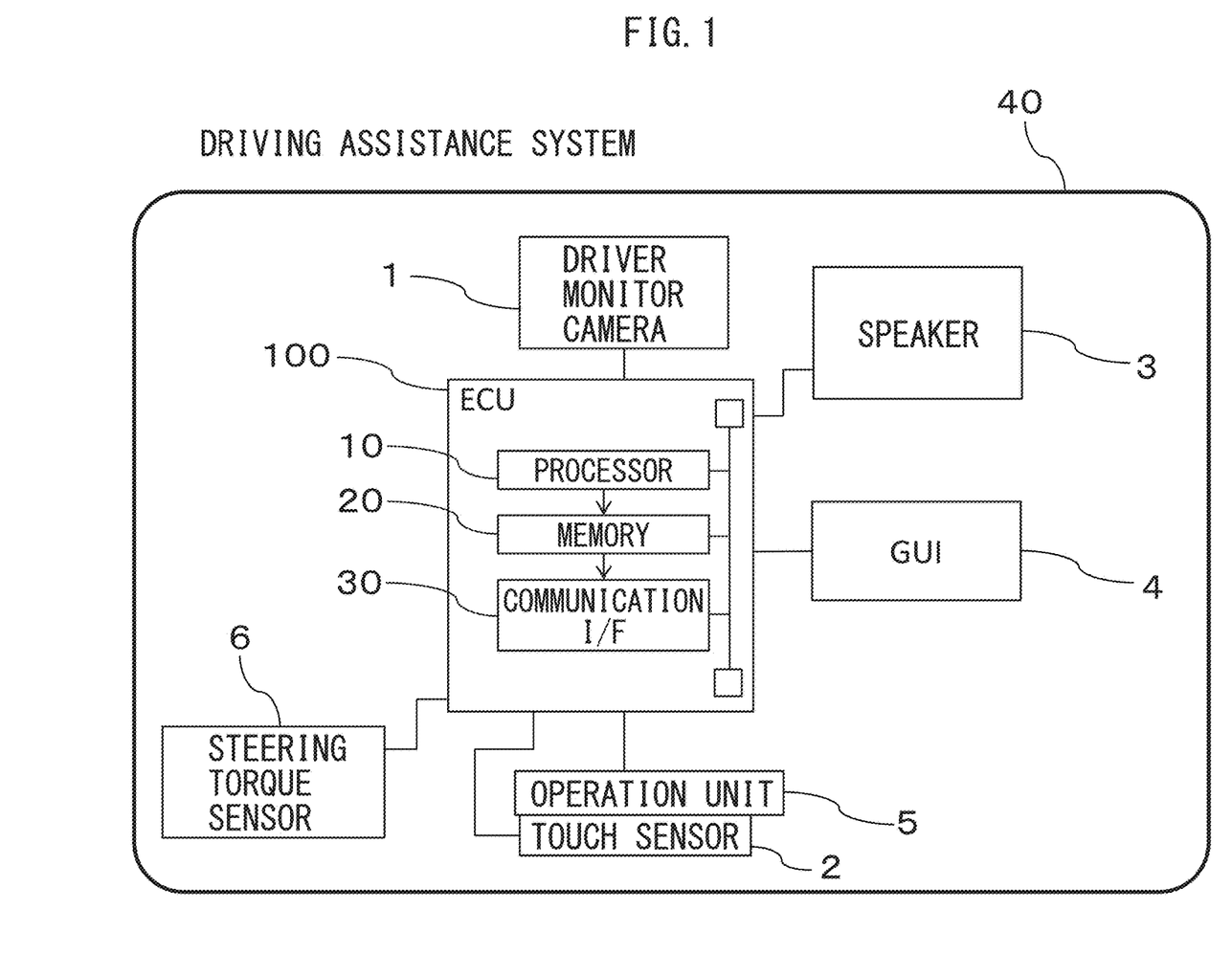
FIG. 1 is a schematic structure diagram of a driving assistance apparatus according to an embodiment.

FIG. 1 is a schematic structure diagram of the driving assistance system 40 according to an embodiment. The driving assistance system 40 includes a driver monitor camera 1, a touch sensor 2, a speaker 3, a GUI (graphical user interface) 4, an operation unit 5, a steering torque sensor 6, and a control unit (electronic control unit: ECU) 100. The driver monitor camera 1, the touch sensor 2, the speaker 3, the GUI 4, the operation unit 5, the steering torque sensor 6, and the control unit 100, respectively, are connected communicably through an in-vehicle network conforming to standards, such as a controller area network (CAN).

The driver monitor camera 1 includes a two-dimensional detector formed by an array of photoelectric conversion elements having sensitivity to visible light, such as a CCD or C-MOS, and an imaging optical system that forms the image of a region set as a photographic subject on the two-dimensional detector. The driver monitor camera 1 is arranged, for example, near a dashboard or a windshield glass inside the vehicle or the like to photograph the face of the driver. The driver monitor camera 1 photographs the driver every predetermined photographing cycle (for example, from 1/30 seconds to 1/10 seconds), and generates an image of the driver. Note that the image acquired by the driver monitor camera 1 is preferably a color image. Every time the driver monitor camera 1 generates an image thereof, the image is output to the control unit 100 through the in-vehicle network.

The touch sensor 2 is formed by a capacitive sensor or a pressure-sensitive sensor or the like, and is arranged in the operation unit 5. The touch sensor 2 detects whether or not the driver is touching the operation unit 5. The operation unit 5 is a component that is operated by the driver, such as a steering wheel, an accelerator pedal, a brake pedal, or a shift lever or the like. When the operation unit 5 is the steering wheel, the touch sensor 2 detects whether or not the driver is holding the steering wheel.

Similarly, when the operation unit 5 is the accelerator pedal or the brake pedal, the touch sensor 2 detects whether or not a foot of the driver is touching the accelerator pedal or the brake pedal. Note that when using an electronic throttle that works in conjunction with the accelerator pedal, it may be detected, on the basis of an electrical signal indicating an opening degree of the electronic throttle, whether or not the foot of the driver is touching the accelerator pedal. Also, when the operation unit 5 is the brake pedal, it may be detected, on the basis of an ON signal turning on brake lamps, that the foot of the driver is on the brake pedal.

The speaker 3 is one example of a notification unit and arranged, for example, near the dashboard or the like to output a voice sound to warn the driver. The GUI 4 is another example of the notification unit and is arranged, for example, near a meter panel or the dashboard or the like to output a display to warn the driver. The GUI 4 is formed by, for example, a liquid crystal display device (LCD) or the like.

The steering torque sensor 6 is a sensor that detects torque of the steering wheel. When the driver is operating by holding the steering wheel, the torque (reaction force) of the steering wheel changes in accordance with the operation. Accordingly, on the basis of a detection value of the torque of the steering wheel, it can be determined whether or not the driver is operating the steering wheel.

The control unit 100 is a component that controls the whole driving assistance system 40, and is one embodiment of a driving assistance apparatus. The control unit 100 includes a processor 10, a memory 20, and a communication interface 30. The processor 10 includes one or more central processing units (CPUs) and peripheral circuits thereof. The processor 10 may further include another arithmetic circuit, such as a logical operation unit, a numerical operation unit, or a graphic processing unit. The memory 20 is one example of a storage unit, and includes, for example, a volatile semiconductor memory and a nonvolatile semiconductor memory. The communication interface 30 is one example of a communication unit, and includes an interface circuit for connecting the control unit 100 to the in-vehicle network.

The driving assistance system 40 thus formed detects whether or not the driver is in a state unsuitable for driving operations, on the basis of information indicating a state of the driver acquired from the driver monitor camera 1. Then, when it is detected that the driver is in a state unsuitable for driving operations, the driving assistance system 40 warns the driver to maintain a state suitable for driving operations. Examples of a state unsuitable for driving operations include driver's states of being distracted, dozing off, being out of the seat, and poor posture or the like. In other words, as one form of the driver's states unsuitable for driving operations, a state unsuitable for the surrounding monitoring of the vehicle can be mentioned.

By making such a warning, the driver is expected to respond to the warning and maintain a state suitable for driving operations, such as stopping a distracted behavior and looking straight ahead of the vehicle, waking up from dozing off, returning to the driver's seat, or correcting his or her posture. Thus, the warning is effective to some extent in making the driver maintain a state suitable for driving operations.

On the other hand, it is also expected that simply warning is not enough to make the driver maintain a state suitable for driving operations. Particularly, for a driver with a vehicle capable of hands-off driving at level 2 or level 3 mentioned above, his or her attention may be distracted from driving during the hands-off driving, due to which simply warning may not make the driver be in a state suitable for driving operations. Additionally, it is also expected that even if, due to the warning, the driver temporarily is in a state suitable for driving operations, he or she may then return into a state unsuitable for driving operations.

For example, a driver who is dozing off during hands-off driving may be awakened by a warning. However, after the warning, the driver may then return to dozing off because he or she has a sensation that the vehicle is being autonomously driven. Similarly, although the warning may make the driver look ahead of the vehicle when he or she is looking aside during hands-off driving, the sensation of the autonomous vehicle driving may once again cause a distraction of the driver after the warning. In other words, simply giving the warning may cause the level of driver's involvement in driving to remain low. Accordingly, in a vehicle that is driven hands-off, simply warning is not enough to make the driver maintain a state suitable for driving operations.

Thus, after giving the warning, the driving assistance system 40 of the present embodiment requires the driver to touch the operation unit 5 for performing driving operations (hereinafter also referred to as touch request). The warning about being in a state suitable for driving operations and the touch request are made in order, which allows the driver to make two types of preparations required for driving operations in order. Then, the driver who has received the touch request actually touches the operation unit 5 and thereby can operate the operation unit 5, so that the level of the driver's involvement in driving increases.

Therefore, in comparison with when simply giving the warning, making the driver touch the operation unit 5 can further improve the driver's attention to driving. Then, this results in enabling the driver to perform an appropriate driving operation when the driver himself or herself is required to perform them. Thus, even for a driver with a low level of involvement in driving during hands-off driving, the level of involvement in driving can be improved.

The touch request is made for a driver with a low level of involvement in driving even after being warned, in order to increase the level of involvement in driving. Therefore, in principle, the touch request is made after making the warning. The touch request may be made simultaneously with cancellation of the warning or after the passage of a certain period of time from the cancellation of the warning.

On the other hand, the warning and the touch request do not have to be necessarily made in this order, and may be simultaneously made or the touch request may be made before the warning. However, when the warning and the touch request are simultaneously made, it may be relatively difficult for the driver to simultaneously respond to both thereof. Thus, preferably, the warning and the touch request are staggered in time.

When it is urgently needed to increase the level of driver's involvement in driving, such as when autonomous driving is switched to manual driving, it is preferable to make the touch request before the warning. For example, when an obstacle is detected ahead of the vehicle during hands-off driving and the driver is in a state unsuitable for driving, the touch request is notified to the driver in addition to a notification of switching to manual driving. Additionally, when the driver is in a state unsuitable for driving at the time of an urgently needed lane change, the touch request is notified to the driver in addition to a notification of switching to manual driving. These allow the driver to touch the operation unit 5 in advance at the time of switching to manual driving, so a problematic situation where the driving operation is impossible after switching to manual driving as the driver does not touch the operation unit 5 can be prevented. Thus, shifting from automatic driving to manual driving can be surely done.

The touch request is cancelled when the driver touches the operation unit 5 for a certain period of time or more. This is because when the driver touches the operation unit 5 for a certain period of time or more, it is expected that the level of driver's involvement in driving is sufficiently high, and the driver continues to operate the operation unit 5 even after cancellation of the touch request.

For example, when the operation unit 5 is the steering wheel, and the touch sensor 2 detects that the driver is touching the steering wheel for a certain period of time or more, the touch request is cancelled. Alternatively, when the operation unit 5 is the steering wheel, and it is detected from a detection value of the steering torque sensor 6 that the driver is operating the steering wheel for a certain period of time or more, the touch request is cancelled. In addition, when using detection by the steering torque sensor 6, the touch request may be cancelled without waiting for the passage of a certain period of time once a reaction force due to the steering operation by the driver is detected.

The touch request is not cancelled when the driver does not touch the operation unit 5 for a certain period of time or more, which thus allows the driver to continuously touch the operation unit 5. Accordingly, the level of the driver's involvement in driving can be surely increased.

Additionally, the touch request may be cancelled when the driver touches the operation unit 5 continuously for a certain period of time or more, and the driver is in a state suitable for driving operations continuously for a certain period of time or more. In this case, the touch request is not cancelled unless the driver continuously touches the operation unit 5 and maintains a state suitable for driving operations, so that the level of the driver's involvement in driving can be more surely increased.

Alternatively, after starting a notification of the touch request, the touch request may be continuously made for a certain period of time regardless of whether or not the driver is touching the operation unit 5, and after the passage of the certain period of time, the touch request may be cancelled. In this case, as the driver is requested to touch the operation unit 5 continuously for a certain period of time, it is expectable that the driver consciously touches the operation unit 5, as a result of which the driver's attention to driving can be increased. After starting the notification of the touch request, there is no need for a process for detecting by the touch sensor 2 whether or not the driver is touching the operation unit 5, thereby enabling process simplification.

When the driver does not touch the operation unit 5 for a certain period of time or more although the touch request has been made, a hands-off warning is given to the driver. The hands-off warning is made as a higher level of warning than the touch request, such as, for example, sounding of a mega-volume buzzer.

Figure 2:
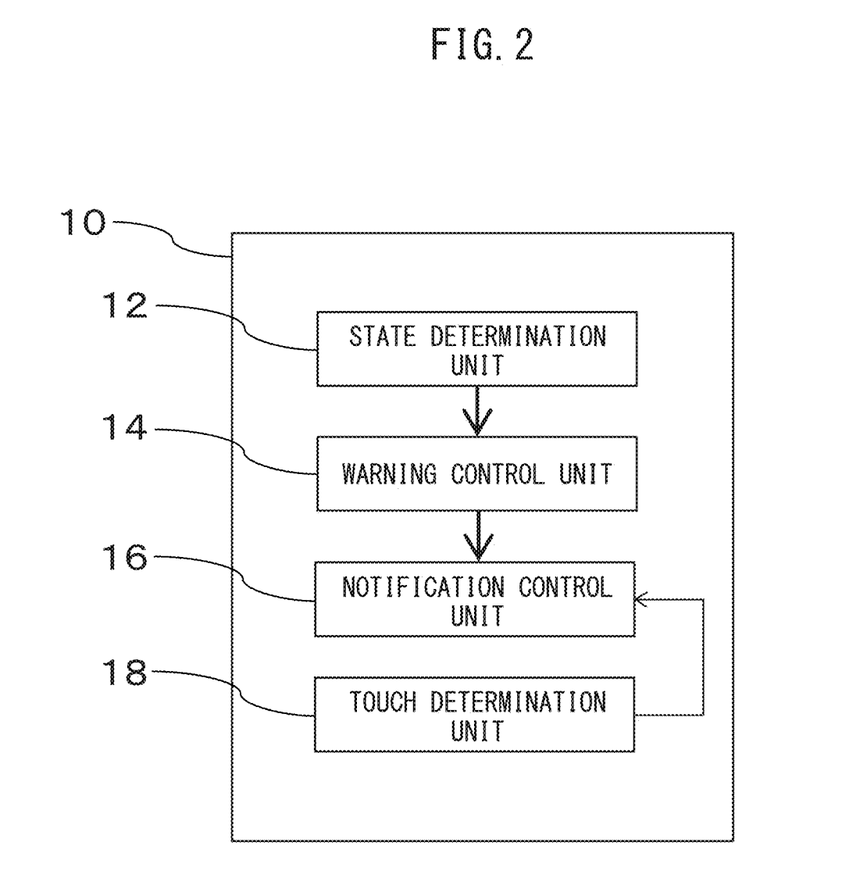
FIG. 2 is a schematic diagram illustrating functional blocks of a processor of a control unit.

FIG. 2 is a schematic diagram illustrating functional blocks of the processor 10 of the control unit 100. The processor 10 of the control unit 100 includes a state determination unit 12, a warning control unit 14, a notification control unit 16, and a touch determination unit 18 to perform the operations as described above. Each of the units included in the processor 10 is, for example, a functional module realized by a computer program that operates on the processor 10. In other words, the functional blocks of the processor 10 are formed by the processor 10 and the program (software) that allows the processor 10 to function. The program may be stored in the memory 20 included in the control unit 100 or in an externally connected storage medium. Alternatively, each of the units included in the processor 10 may be a dedicated arithmetic circuit arranged in the processor 10.

The state determination unit 12 determines whether or not the driver is in a state unsuitable for the surrounding monitoring of the vehicle, on the basis of image information of the driver in the vehicle photographed by the driver monitor camera 1. When it is determined by the state determination unit 12 that the driver is in a state unsuitable for the surrounding monitoring of the vehicle, the warning control unit 14 performs a control to warn the driver to maintain a state suitable for the surrounding monitoring through the speaker 3 or the GUI 4.

The notification control unit 16 performs control for notifying the driver of a request for operably touching the operation unit 5 through the speaker 3 or the GUI 4. The touch determination unit 18 determines whether or not the driver has touched the operation unit 5 continuously for a certain period of time.

Figure 3:
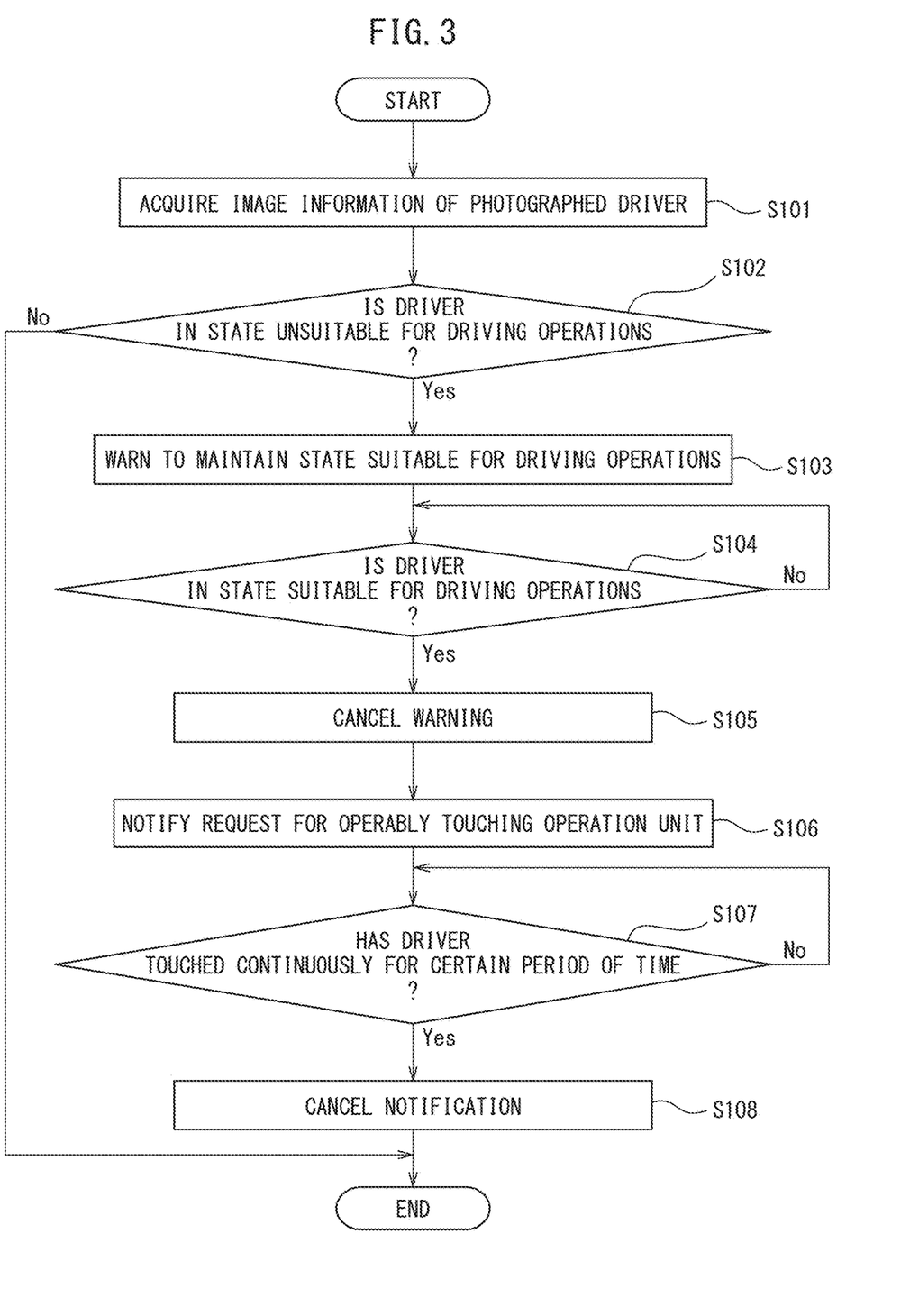
FIG. 3 is a flowchart illustrating a process flow regarding driving assistance.

FIG. 3 is a flowchart illustrating a process flow regarding driving assistance. The process of FIG. 3 is executed every predetermined control cycle by the processor 10 of the control unit 100. First, the image information of the photographed driver is acquired from the driver monitor camera 1 (step S101). Next, on the basis of the image information acquired from the driver monitor camera 1, the state determination unit 12 determines whether or not the driver is in a state unsuitable for driving operations (step S102). Specifically, the state determination unit 12 determines, on the basis of an image acquired from the driver monitor camera 1, whether or not the driver is in a state such as that of being distracted, dozing off, being out of the seat, or poor posture or the like.

Next, on the basis of a result of the determination at step S102, when the driver is in a state unsuitable for driving operations, the warning control unit 14 warns the driver to maintain a state suitable for driving operations (step S103). The warning is made by a voice sound output from the speaker 3 or a display on the GUI 4. For example, when the driver is in a state of distraction, the warning is made by displaying characters such as "Look ahead!" on the meter panel and outputting the same message as a voice sound. Alternatively, the warning may be made by outputting a warning sound from the speaker 3, and furthermore, may be made by a combination of at least any two of the above-mentioned display, voice sound and warning sound. Still alternatively, the warning may be a warning through tactile sensation by a haptic device, a warning by seat belt vibration, a warning by seat vibration, or the like. Note that, on the basis of the result of the determination at step S102, when the driver is not in a state unsuitable for driving operations, the process is ended.

Next, on the basis of the image information acquired from the driver monitor camera 1, the state determination unit 12 determines whether or not the driver is in a state suitable for driving operations (step S104). Then, the warning control unit 14 cancels the warning when the driver is in a state suitable for driving operations (step S105). On the other hand, when the driver is not in a state suitable for driving operations, the process moves again to step S104 to repeat the processing of step S104.

Specifically, at step S104, on the basis of the image information acquired from the driver monitor camera 1, when the driver is not in a state such as that of being distracted, dozing off, being out of the seat, or poor posture or the like, the warning control unit 14 cancels the warning at step S105.

Next, the notification control unit 16 notifies the driver of a request (touch request) for operably touching the operation unit 5 (step S106). The notification of the touch request is made by a voice sound output from the speaker 3 or a display on the GUI 4. The notification of the touch request is made by, for example, displaying a notification, such as "Please hold the steering wheel", on the meter panel and outputting the same notification as a voice sound. Alternatively, the notification of the touch request may be a notification through tactile sensation by a haptic device, a notification by seat belt vibration, a notification by seat vibration, or the like.

Next, on the basis of a detection signal of the touch sensor 2, the touch determination unit 18 determines whether or not the driver has touched the operation unit 5 continuously for a certain period of time (step S107). Then, when the driver has touched the operation unit 5 continuously for a certain period of time, the notification control unit 16 cancels the notification of the touch request (step S108), and the process is ended. On the other hand, when the driver has not touched the operation unit 5 continuously for a certain period of time, the process moves again to step S107 to repeat the processing of step S107.

Thus, in the process of FIG. 3, when the driver is in a state unsuitable for driving operations, the warning is given to the driver, and a notification of the touch request is made after cancellation of the warning. Then, when the driver has touched the operation unit 5 continuously for a certain period of time after the notification of the touch request, the notification of the touch request is cancelled. Accordingly, in a driver who has a low level of involvement in driving despite a warning, the level of involvement in driving can be increased.

Figure 4:
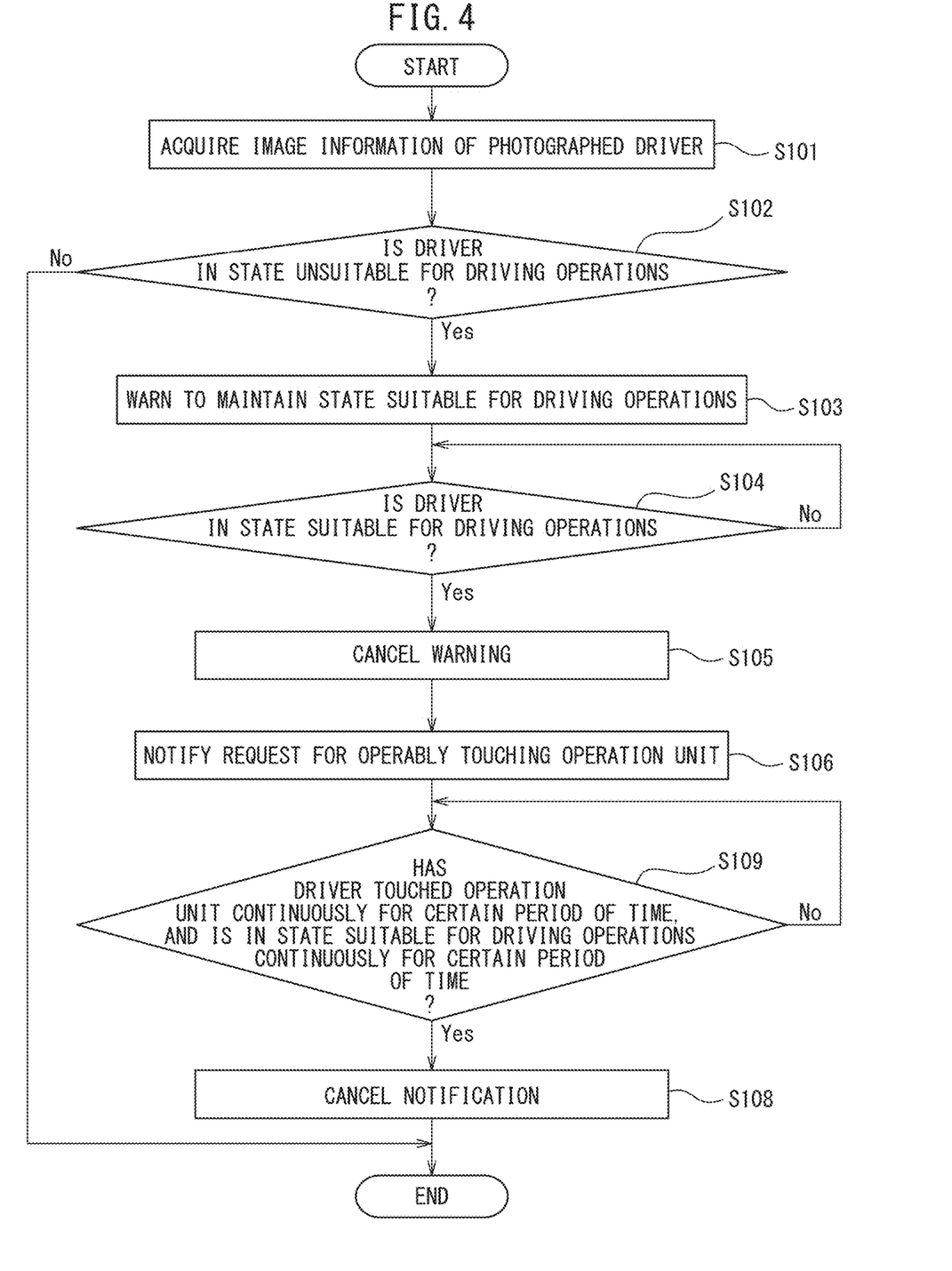
FIG. 4 is a flowchart illustrating a process where a touch request is cancelled when a driver holds an operation unit continuously for a certain period of time or more, and the driver is in a state suitable for driving operations continuously for a certain period of time or more.

As described above, the notification control unit 16 may cancel the touch request when the driver touches the operation unit 5 continuously for a certain period of time or more, and the driver is in a state suitable for driving operations continuously for a certain period of time or more. FIG. 4 is a flowchart illustrating a process for this case.

In FIG. 4, there is provided a processing of step S109 instead of the processing of step S107 of FIG. 3. Other pieces of processing of FIG. 4 are the same as those of FIG. 3. At step S109, it is determined whether or not the driver has touched the operation unit 5 continuously for a certain period of time and is in a state suitable for driving operations continuously for a certain period of time. Then, when the driver has touched the operation unit 5 continuously for a certain period of time and is in a state suitable for driving operations continuously for a certain period of time, the notification control unit 16 cancels the notification of the touch request (step S108). For example, when the driver's distraction state has been detected as a state unsuitable for driving operations, the notification of the touch request is cancelled when the driver has held the steering wheel continuously for a certain period of time and is attentively looking ahead continuously for a certain period of time.

On the other hand, when the driver has not touched the operation unit 5 continuously for a certain period of time or when the driver is in a state unsuitable for driving operations continuously for a certain period of time, the process moves again to step S109 to repeat the processing of step S109.

In the processing of FIG. 4, the touch request is notified to the driver until the driver touches the operation unit 5 continuously for a certain period of time and comes into a state suitable for driving operations continuously for a certain period of time, so that the level of the driver's involvement in driving can be surely increased.

Figure 5:
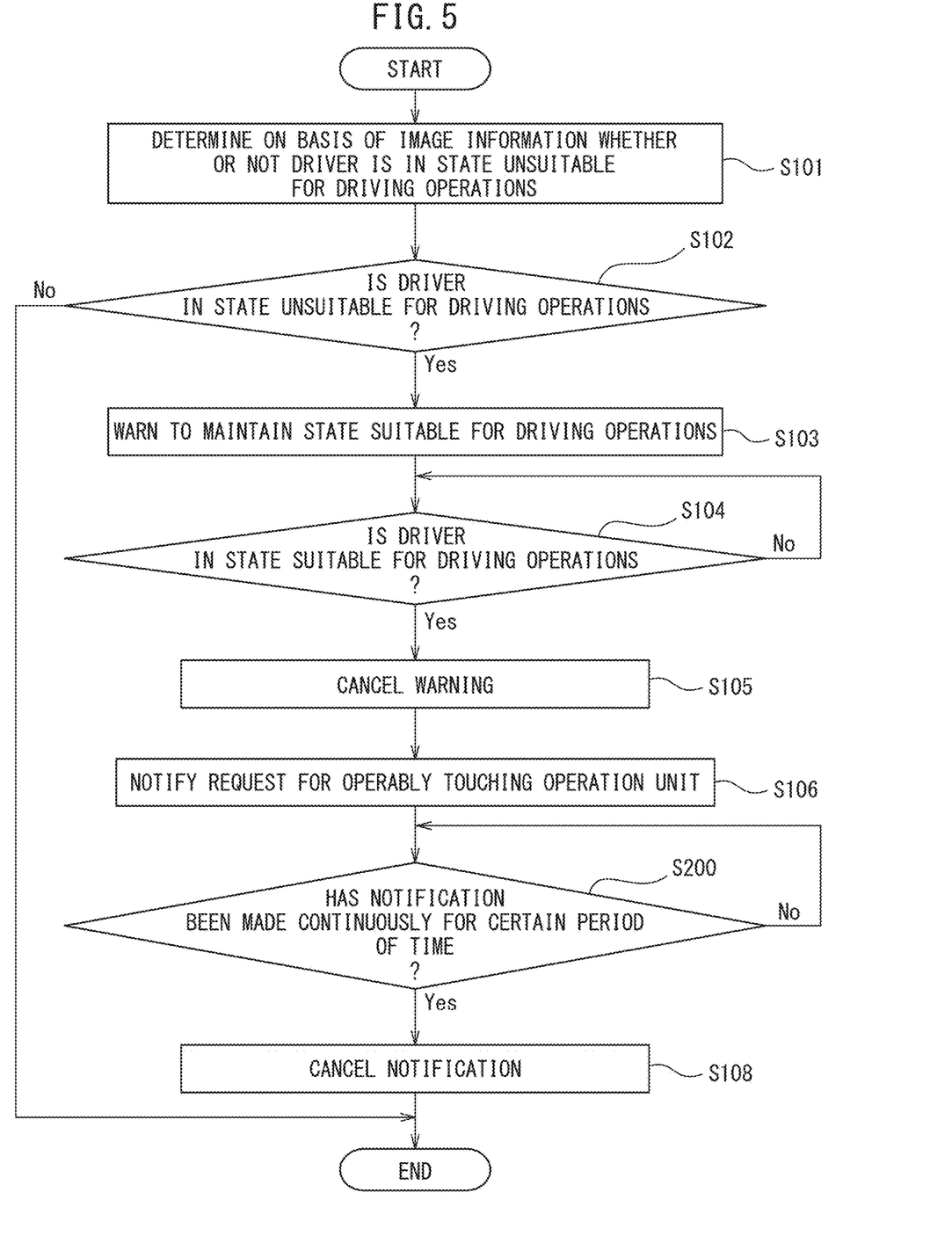
FIG. 5 is a flowchart illustrating a process where after making a touch request, a notification of the touch request is made for a certain period of time regardless of whether or not the driver is holding the operation unit, and after that, the touch request is cancelled.

Additionally, as described above, after starting the notification of the touch request, the touch request may be continuously made for a certain period of time regardless of whether or not the driver is holding the operation unit 5, and may be cancelled after the passage of the certain period of time. FIG. 5 is a flowchart illustrating a process for this case.

In FIG. 5, a processing of step S200 instead of a processing of step S107 of FIG. 3 is provided. Other pieces of processing of FIG. 5 are the same as those of FIG. 3. At step S200, it is determined whether or not the notification of the touch request has been made continuously for a certain period of time. Then, when the notification has been made continuously for the certain period of time, the notification control unit 16 cancels the notification of the touch request (step S108). On the other hand, when the notification has not been made continuously for the certain period of time, the process moves again to step S200 to repeat the processing of step S200.

In the processing of FIG. 5, the touch request is continuously made for a certain period of time regardless of whether or not the driver is holding the operation unit 5, and is cancelled after the passage of the certain period of time, so that the driver can be expected to consciously touch the operation unit 5. As a result, the level of the driver's involvement in driving can be increased. In addition, as compared with FIG. 3, more process simplification can be done.

Figure 6:
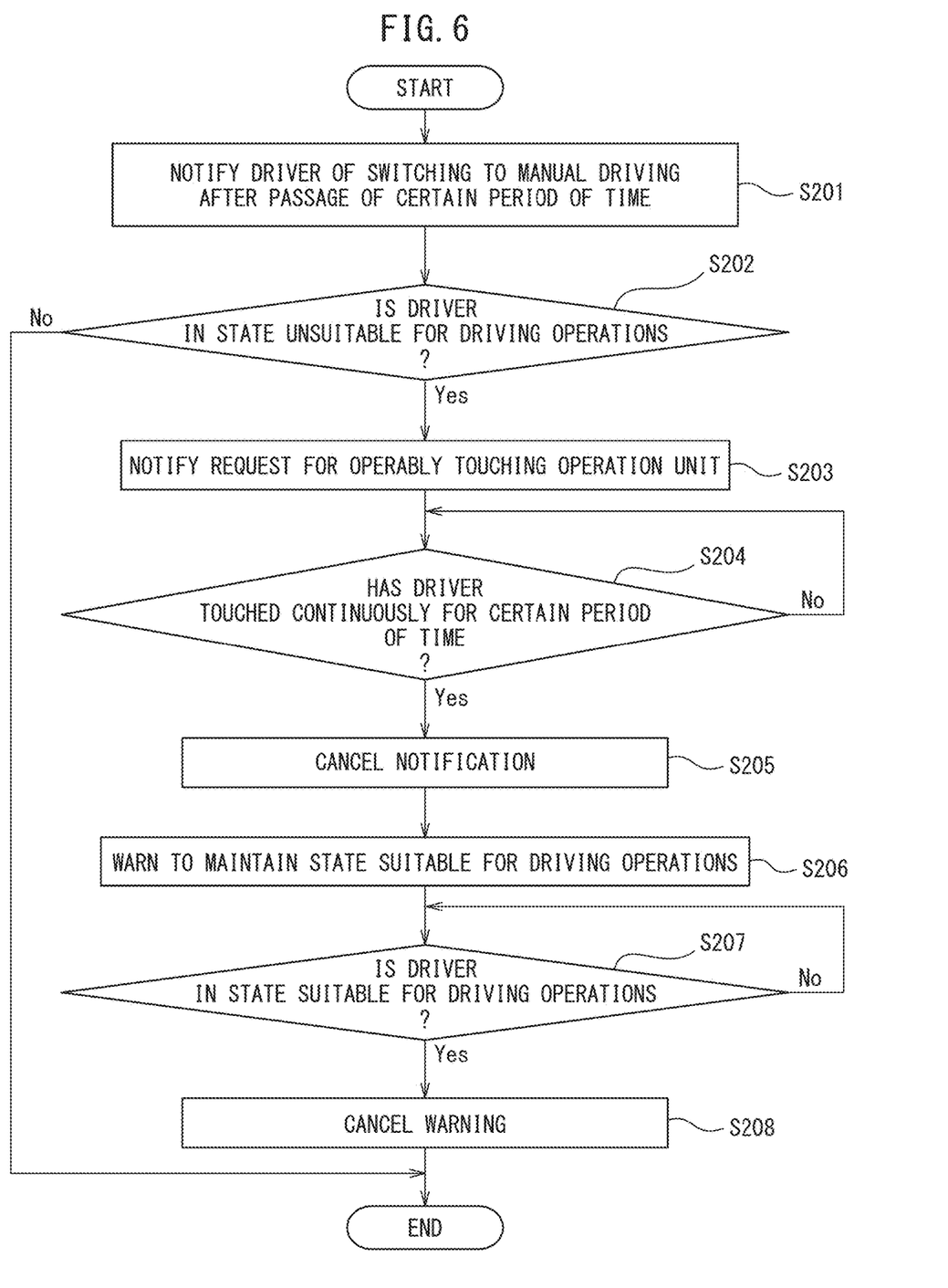
FIG. 6 is a flowchart illustrating a process where a touch request is made earlier than a warning when it is urgently needed to increase the level of driver's involvement in driving.

Additionally, as described above, it is preferable to make a touch request earlier than a warning when it is urgently needed to increase the level of the driver's involvement in driving, such as switching from automatic driving to manual driving. FIG. 6 is a flowchart illustrating a process for this case. First, for example, when the presence of an obstacle is detected ahead of the vehicle during hands-off driving, the driver is notified that switching to manual driving will be performed after the passage of a certain period of time (step S201).

Next, on the basis of the image information acquired from the driver monitor camera 1, the state determination unit 12 determines whether or not the driver is in a state unsuitable for driving operations (step S202). Specifically, the state determination unit 12 determines whether or not the driver is in a state such as that of being distracted, dozing off, being out of the seat, or poor posture or the like, on the basis of the image acquired from the driver monitor camera 1.

Next, the notification control unit 16 notifies the driver of a request (touch request) for operably touching the operation unit 5 (step S203). Next, on the basis of a detection signal of the touch sensor 2, the touch determination unit 18 determines whether or not the driver has touched the operation unit 5 continuously for a certain period of time (step S204). Then, when the driver has touched the operation unit 5 continuously for a certain period of time, the notification control unit 16 cancels the notification of the touch request (step S205). On the other hand, when the driver has not touched the operation unit 5 continuously for a certain period of time, the process moves again to step S204 to repeat the processing of step S204.

Next, the warning control unit 14 warns the driver to maintain a state suitable for driving operations (step S206).

Next, on the basis of the image information acquired from the driver monitor camera 1, the state determination unit 12 determines whether or not the driver is in a state suitable for driving operations (step S207). Then, the warning control unit 14 cancels the warning when the driver is in a state suitable for driving operations (step S208). On the other hand, when the driver is not in a state suitable for driving operations, the process moves again to step S207 to repeat the processing of step S207.

In the processing of FIG. 6, the request for operably touching the operation unit 5 is notified to the driver at the time of switching to manual driving, which can cause the driver to touch the operation unit 5. Accordingly, the level of the driver's involvement in driving can be increased before switching to manual driving, which can therefore ensure shifting from automatic driving to manual driving.

Figure 8:
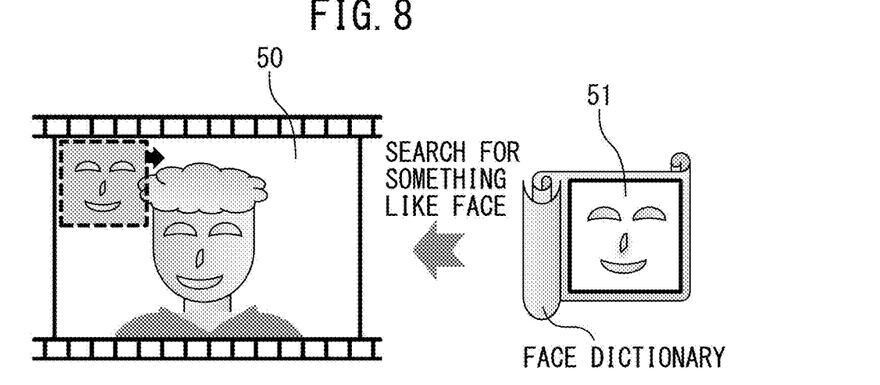
FIG. 8 is a schematic diagram illustrating a method for determining whether or not there is something like a face in an image at step S302 of FIG. 7.
Figure 9:
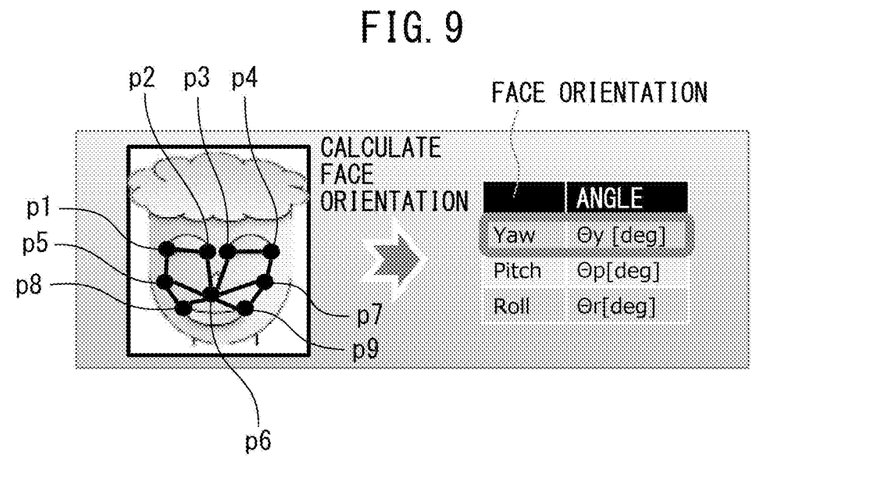
FIG. 9 is a schematic diagram illustrating a method for calculating a face orientation angle from a distance between facial feature points at steps S303 and S304 of FIG. 7.

Next, with reference to a flowchart of FIG. 7, and FIGS. 8 and 9, a process for determining a driver's state of distraction will be described as an example of a process for determining whether or not the driver is in a state unsuitable for driving operations.

Figure 7:
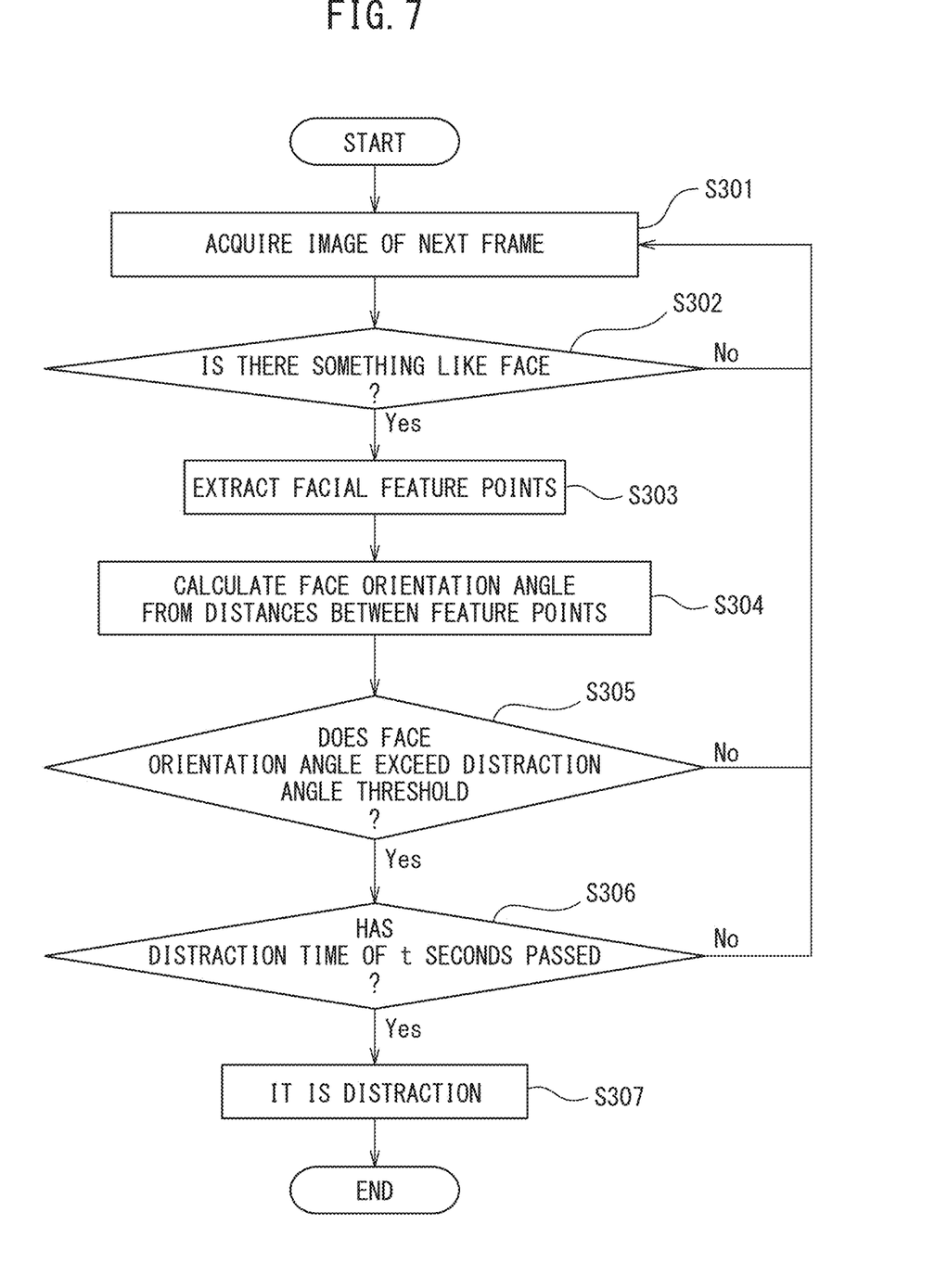
FIG. 7 is a flowchart illustrating an example of a process for determining whether or not the driver is in a state unsuitable for driving operations.

FIG. 7 is a flowchart illustrating the process for determining the driver's state of distraction. First, an image of a frame to be focused on is acquired from the driver monitor camera 1 (step S301). Next, it is determined whether or not there is something like a face in the acquired image (step S302). FIG. 8 is a schematic diagram illustrating a method for determining whether or not there is something like a face in the image at step S302. As illustrated in FIG. 8, an image 50 of the frame acquired by the driver monitor camera 1 is compared with an image of a face dictionary 51 to determine whether or not there is something like a face in the image 50. Note that the comparison can be made by a method such as a known template matching or the like.

When the image 50 includes something like a face, facial feature points such as outer corners of eyes, corners of mouth, and nose are extracted from the image 50, for example, on the basis of template images thereof (step S303), and a face orientation angle is calculated from a distance between the feature points (step S304). FIG. 9 is a schematic diagram illustrating a method for calculating a face orientation angle from the distance between the facial feature points at steps S303 and S304. As illustrated in FIG. 9, facial feature points p1 to p9 are extracted, whereby a face orientation angle can be calculated in accordance with a distance between the feature points.

Figure 10:
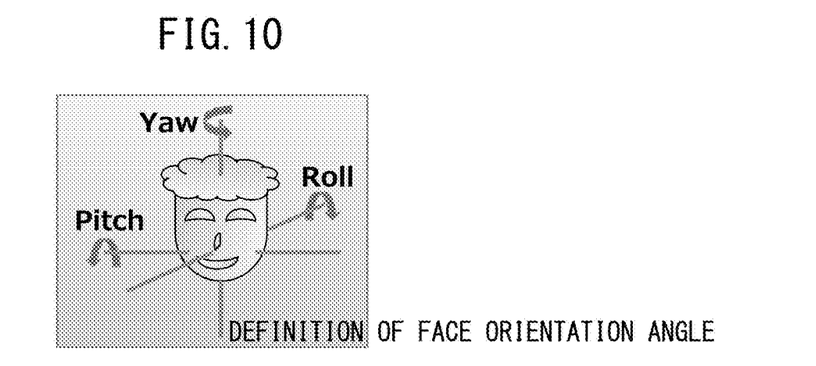
FIG. 10 is a schematic diagram illustrating definitions of face orientation angles.

As one example, calculation of a face orientation angle is performed on the basis of the distance between the feature points when the driver faces front as a reference. FIG. 10 is a schematic diagram illustrating definitions of face orientation angles. A horizontal face orientation angle of the driver is defined as yaw (Yaw) angle, and a vertical face orientation angle thereof is defined as pitch (Pitch) angle. Numerical values of distances between the facial feature points when the driver faces front can be previously stored in the memory 20 of the control unit 100. For example, a distance between points p1 and p2 when the driver faces front is used as a reference. When the distance between the points p1 and p2 becomes shorter than the reference when the driver faces in any direction, the yaw angle can be determined to have changed. The amount of the change in the yaw angle can be calculated from the amount of a change in the distance between the points p1 and p2.

Similarly, a distance between points p1 and p5 when the driver faces front is assumed as a reference. When the distance between the points p1 and p5 becomes shorter than the reference when the driver faces in any direction, the pitch angle can be determined to have changed. Then, the amount of the change in the pitch angle can be calculated from the amount of a change in the distance between the points p1 and p5. In addition, although a change in a roll (Roll) angle is not directly used for determining distraction, the change is obtainable from a rotation angle of each feature point with respect to a rotation center of the driver's face (head) model, and a rotation center is calculated from the moving trajectories of each feature point.

Next, it is determined whether or not the face orientation angle exceeds a distraction angle threshold (step S305). When the face orientation angle exceeds the distraction angle threshold, it is determined whether or not a distraction continuation time of "t" seconds has passed (step S306). Then, when the distraction continuation time of "t" seconds has passed, the driver is determined to be in a state of distraction (step S307). When the face orientation angle does not exceed the distraction angle threshold at step S305 or the distraction continuation time of "t" seconds has not passed at step S306, the process returns to step S301.

For example, when the amount of the change in the yaw angle exceeds the distraction angle threshold and the distraction continuation time of "t" seconds has passed, it can be determined that the driver is looking aside by horizontally rotating his or her head. Additionally, when the amount of the change in the pitch angle exceeds a predetermined threshold and the distraction continuation time of "t" seconds has passed, it can be determined that the driver is looking aside by vertically rotating his or her head. Thus, when the process moves to step S307, it is determined that the driver is in a state of distraction, so that the driver is determined to be in a state unsuitable for driving operations. The process is ended after step S307.

As described above, in the process of FIG. 7, it can be determined whether or not the driver is in a state of distraction on the basis of the distance between the facial feature points in the image.

FIG. 7 has exemplified the process for determining whether or not the driver is in a state of distraction, as the process for determining whether or not the driver is in a state unsuitable for driving operations. However, other states unsuitable for driving operations can also be determined on the basis of the image photographed by the driver monitor camera 1. For example, the driver's state of dozing off or not dozing off can be calculated on the basis of a percentage of eyes closure of the driver's eyes. The percentage of eyes closure can be obtained by detecting the opening and closing of the driver's eyes from a face image of the driver and then calculating a percentage of eyes-closed time within a predetermined time. In this case, the driver's eyes are detected by, for example, template matching or inputting the image in an eye detection identifier, and it is determined whether the eyes are open or closed by setting a threshold for eye aspect ratio, thereby calculating a percentage of eyes closure. When the percentage of eyes closure is equal to or more than a predetermined value, the driver is determined to be in a dozing state, so that it is determined that the driver is in a state unsuitable for driving operations.

In addition, the driver's other states such as being out of the seat or poor posture or the like can also be detected by comparing image information of the driver acquired from the driver monitor camera 1 with a template image serving as a reference. Regarding the driver's state of being out of the seat, when the image photographed by the driver monitor camera 1 does not include the driver's face, it is determined that the driver is out of seat.

Furthermore, in FIG. 7, the process for determining whether or not the driver is in a state of distraction on the basis of the face orientation of the driver has been exemplified as the process for determining whether or not the driver is in a state unsuitable for driving operations. However, a direction of a line of sight of the driver may be detected by a known method. Then, on the basis of the direction of the line of sight, it may be determined whether or not the driver is in a state unsuitable for driving operations.

According to the present embodiment, as described above, when it is determined that the driver is in a state unsuitable for driving operations, the warning is given to the driver, and the touch request for touching the operation unit 5 is notified to the driver. Thus, since the driver who has a low level of involvement in driving despite the warning is notified to touch the operation unit 5, the level of driver's involvement in driving can be increased. This enables the driver to avoid situations where he or she is negligent in driving, so that intended driving operations, such as avoidance of danger, can be achieved.

The invention claimed is:

1. A driving assistance apparatus for a vehicle capable of hands-off driving that lets a driver take his or her hands off a steering wheel, the driving assistance apparatus comprising:
   a processor configured to:
      determine, on a basis of sensor information indicating a state of the driver, whether or not the driver is in a state unsuitable for surrounding monitoring of the vehicle during the hands-off driving;
      warn the driver through a notification device when it is determined that the driver is in the state unsuitable for the surrounding monitoring; and
      notify the driver, through the notification device, of a request for holding the steering wheel by displaying the request or by outputting the request as a voice sound;
      wherein the processor is further configured to analyze an image received from a driver monitor camera, to determine if a face is present in the image, to determine a face orientation angle from pitch, roll and yaw angles of the face if a face is determined to be in the image, to determine if the face orientation angle exceeds a distraction angle, and if the face orientation angle exceeds the distraction angle, to determine if a time period of distraction of the driver exceeds a predetermined threshold, and if the time period of distraction exceeds the predetermined threshold, to determine that the driver is in a state unsuitable for surrounding monitoring of the vehicle; and
      wherein after notifying the driver of a request for holding the steering wheel, the processor is further configured to determine if a touch sensor of the steering wheel indicates that the driver has touched the steering wheel continuously for a predetermined time period, and if the driver touches the steering wheel continuously for the predetermined time period, to cancel the notification.

2. The driving assistance apparatus according to claim 1, wherein the processor notifies the driver of the request after cancellation of the warning.

* * * * *